April 11, 1961 — A. D. BIAGI — 2,979,609
TRANSMITTER SPECTRUM MONITOR
Filed May 18, 1959 — 3 Sheets-Sheet 1

INVENTOR.
ALVARO D. BIAGI
BY
ATTORNEY

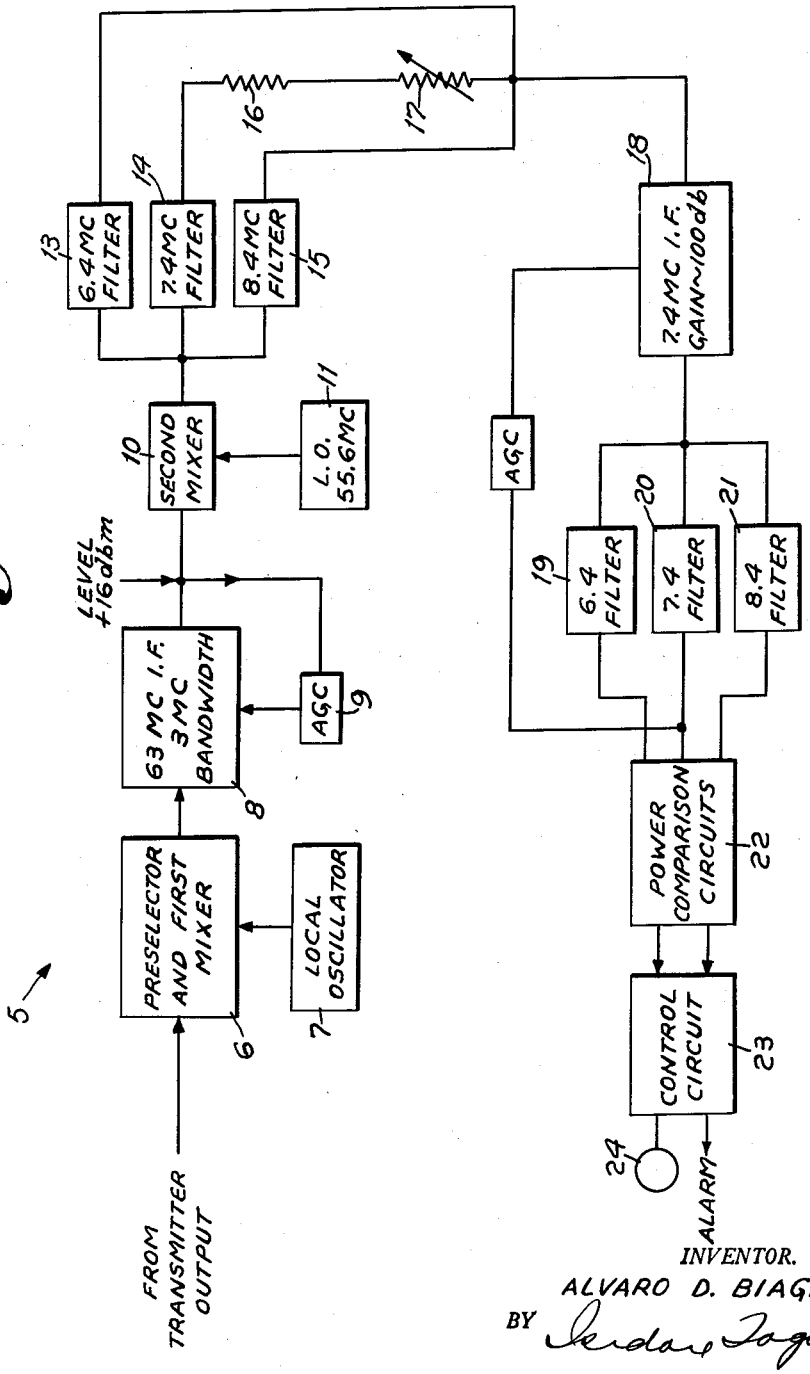

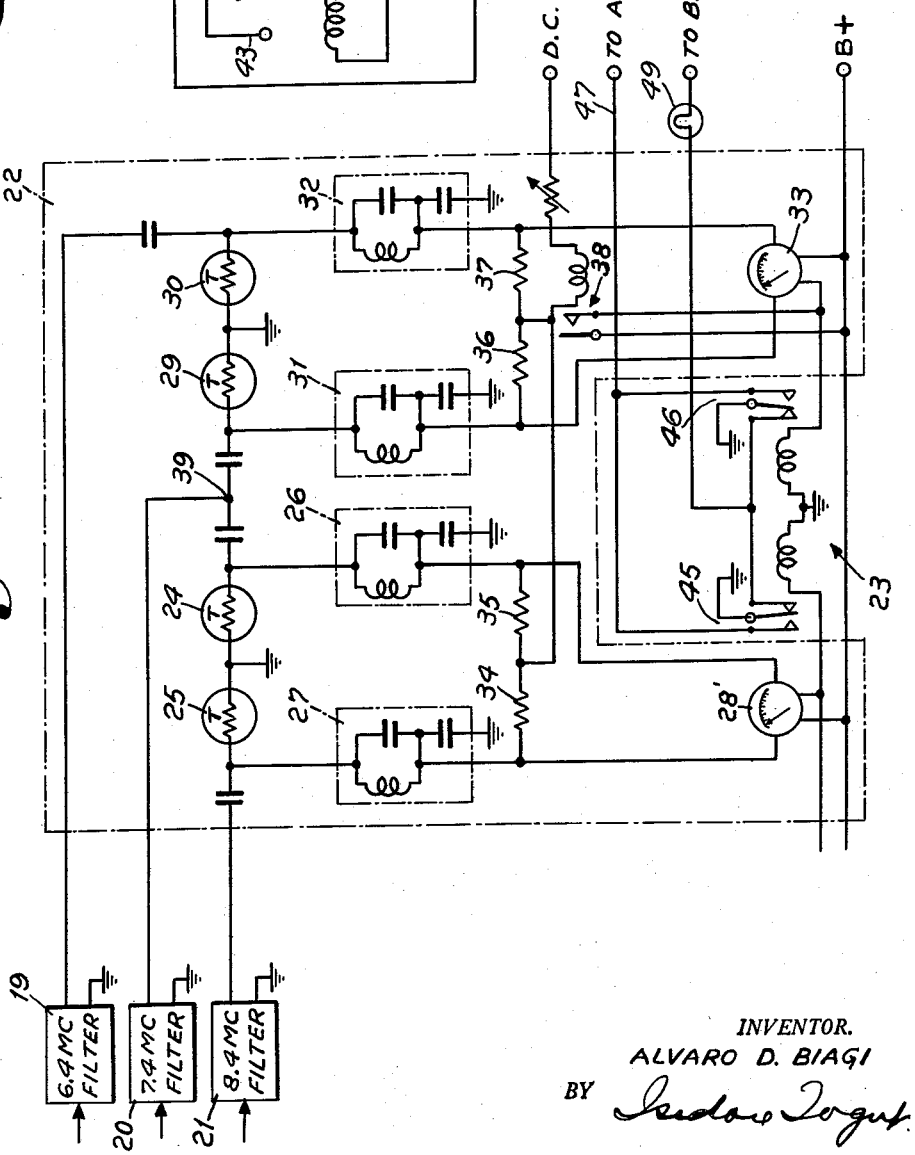

United States Patent Office 2,979,609
Patented Apr. 11, 1961

2,979,609
TRANSMITTER SPECTRUM MONITOR

Alvaro D. Biagi, River Edge, N.J., assignor to International Telephone and Telegraph Corporation, Nutley, N.J., a corporation of Maryland Filed May 18, 1959, Ser. No. 813,713

8 Claims. (Cl. 250—17)

This invention relates to a monitor for a radio transmitter and more particularly to a monitor spectrum analyzer.

In radio transmitters, it is required that the transmitted signal be constantly monitored to be sure that the station is transmitting the required signal on the required or desired frequency and that it has the required power. This requirement is much more stringent in the case of a plurality of transmitters which are transmitting frequencies that are relatively close together. Such a system is the Tacan aerial navigation system which utilizes many beacon transponders, each of which is crystal regulated to operate on a given frequency. The frequency of each transponder is separated from the other by a minimum of one megacycle. It is therefore important that the monitoring system be certain that the beacon concentrates the required ratio of energy in the "on channel" portion of its band with respect to the amount of energy in the "off channel" or adjacent portions. This is necessary in order to prevent interference with adjacent channels, in as much as the different Tacan beacons are assigned different frequencies and it is absolutely requisite that the receiver on the aircraft receive signals from one of the beacons to which it is tuned and not from another. Obviously, any error in the reception of the signal would mislead the aircraft or cause it to "home in" on the wrong signal. The military services and the Civil Aeronautics Administration have stipulated certain spectrum distributions for Tacan which must be adhered to. Typically, it is required that for the radio frequency pulse spectrum the energy level that is contained in the 0.5 megacycle band centered on a frequency plus or minus one megacycle from the "on channel" frequency shall be at least 60 db below the energy level contained in the 0.5 megacycle band centered on the "on channel" frequency. The prior art does not disclose a monitor spectrum analyzer which can measure a power ratio of adjacent channel to "on channel" signals to the extent of 60 db. Furthermore, the prior art monitor spectrum analyzers use sweep circuits and a cathode ray tube which indicates the frequency distribution of the spectrum on the screen but does not show the required power relation or determine the specific power ratio between the "on channel" and the adjacent channel signals.

It is therefore an object of this invention to provide a spectrum analyzer which will measure power ratios of "on channel" to adjacent channel signals up to and better than 60 db.

It is a further object to provide a monitor spectrum analyzer which will measure the power ratio of "on channel" to adjacent channel signals and upon the determination of the power ratio thereof and an indication that the determined power ratio is less than a required power ratio, the monitor spectrum analyzer will discontinue automatically operation of the transmitter.

Still another object is the provision of a monitor spectrum analyzer which will provide indicating means for the station attendant to inform him when the power ratio of the adjacent channel signals is less than the desired power ratio.

A feature of this invention is a monitor for a transmitter transmitting radio frequency waves containing a desired band of frequencies and bands of frequencies adjacent said desired frequency band which comprises means to separate the frequency band. Means are provided to compare the power of the transmitted radio frequency waves of a desired frequency band with the power of the transmitted radio frequency waves of an adjacent frequency band and means are further provided responsive to the comparison to indicate when the ratio of the power of the desired frequency band to the power of an adjacent frequency band falls below a given ratio.

Another feature is that the monitor contains means to discontinue operation of the transmitter when the power ratio between the desired frequency band and the adjacent frequency band falls below a given and desired power ratio.

A further feature is the provision of a power comparing circuit for a plurality of frequency bands containing a desired frequency band and an adjacent frequency band that comprises means to compare the relative power of the frequency bands. Means are further provided to attenuate the signal of the desired frequency band to a given level indicative of the given ratio of the power of the desired frequency band to the adjacent frequency band. Means are provided to compare the power of the attenuated desired frequency band with the power of the adjacent frequency band and responsive to said comparison to indicate the relative ratio of the power of the attenuated desired frequency band to the power of the adjacent frequency band.

Still another feature is that the comparing means comprises a thermistor bridge circuit and means to supply a direct current bias to the bridge. The attenuated filtered signals of the desired frequency band and the signals of the adjacent band are coupled to corresponding inputs of the bridge circuit. A meter relay is coupled to the output of the bridge and will indicate bridge balance when the powers of the desired frequency band signals and the adjacent frequency band signals are equal and will indicate deviations of the ratio of the desired frequency band signal to the adjacent frequency band signal from the given ratio.

The above-mentioned and other features and objects of this invention will become more apparent by reference to the following description taken in conjunction with the accompanying drawings, in which:

Fig. 3 is a block diagram of the system of this invention;

Fig. 4 is a schematic diagram showing the detailed circuitry of the elements of the power comparison unit of the block diagram of Fig. 3;

Fig. 5 is a detailed circuit diagram of the meter relay used in this invention.

Figure 1:
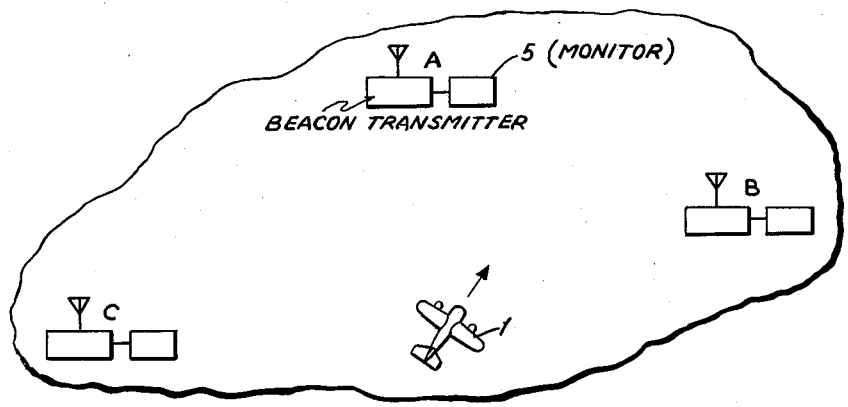
Fig. 1 is an illustration showing three beacon transponders or transmitters separated in space and an approaching aircraft having a radio receiver tuned to the frequency of one of the transponders.
Figure 2:
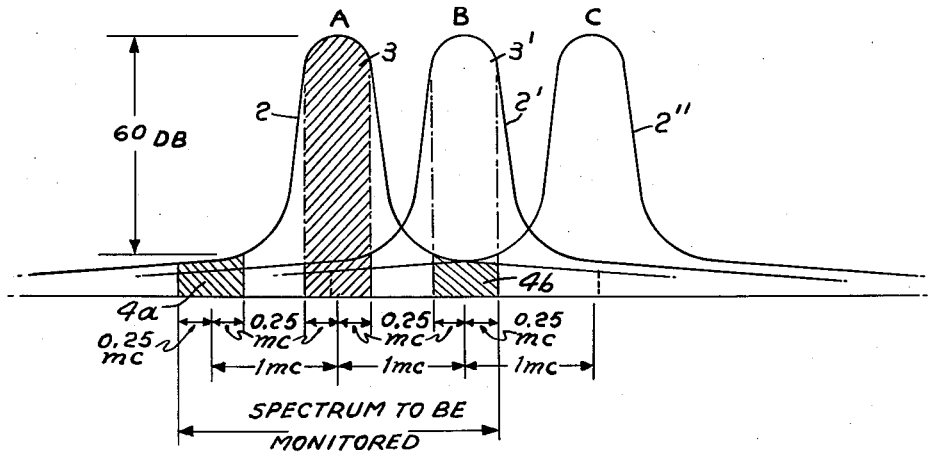
Fig. 2 is a spectrum distribution of the transmitted signals of transponders A, B and C.

Referring now Figs. 1 and 2, there is shown an arbitrary geographical location of a plurality of beacon transmitters. Beacon transponders or transmitters A, B and C are located at different points as may be required. An airplane 1 is flying in the area covered by the signals which are transmitted from transponders A, B and C. The airplane, it is assumed, is tuned to the "on channel" frequency being transmitted by the transponder A. Fig.

2 shows the frequency distribution of the transmitted radio frequency waves of channels A, B and C. They are shown with center frequencies spaced one megacycle apart. The band of the "on channel" frequencies in all three cases is 0.5 megacycle centered about the center frequency. The adjacent channels of interest, as shown in this illustration, are spaced one megacycle apart on either side of the center frequency of channel A, which is explained in detail for purpose of clarifying this invention, though it is to be understood that the same "on channel" energy band and adjacent channels of interest apply in the same manner to channels B and C. The energy spectrum of channel A and also of the other channels is defined by the line 2, which shows the greatest energy distribution in the area of the "on channel" band 3 and sharply decreasing energy in the side bands. It is required that the energy within the spectrum in the adjacent channels 4a or 4b, each of which has a bandwidth of 0.5 megacycle centered about a frequency one megacycle from the center frequency of channel A, must be down at least 60 db or greater in comparison with the energy of the "on channel" band 3. It is obvious from an inspection of the frequency spectrum that the adjacent channels 4a and 4b of transponder A fall within the "on channel" portion of the adjacent channel B and the adjacent channel to the left of A not shown. The spectrum to be monitored is the spectrum which extends 1.25 megacycles on either side of the center frequency of the "on channel" frequency.

In Fig. 3, there is shown a block diagram of the monitor spectrum analyzer of this invention. The transponder signal to be monitored is supplied at a level of from 0 dbm to −10 dbm (peak). A preselector and first mixer 6 are used to convert the signal to the first intermediate frequency. Local oscillator power for this conversion is supplied by a crystal controlled local oscillator source 7. Signals emerging from the preselector mixer 6 are at the first intermediate frequency and have suffered a loss of approximately 9 db. Consequently, their level at the input to the first intermediate frequency amplifier 8 will be in the range of minus 9 to minus 19 dbm peak. At this point, it is necessary to examine the possible average power relationships in the signal. The average signal power is approximately 2 percent of peak power in a Tacan transponder. Therefore, we may say that the average power at this point in the circuit lies somewhere in the region of minus 26 to minus 36 dbm (17 db lower than peak). Since the major part of this power will lie in a 0.5 megacycle band centered about the nominal channel frequency or the "on channel," it is necessary to consider the noise power in the same frequency band. If it is assumed that there is a twelve db system noise figure, the noise power referred to the input of the intermediate frequency amplifier 8 is less than minus 110 dbm. This figure is based on a crystal converter whose conversion loss is 6 db, having a crystal noise temperature of 3, a preselector loss of 3 db and an IF noise figure of at least 3 db. Since the minimum average input power to the intermediate frequency amplifier 8 is minus 36 dbm and the expected noise power is smaller than minus 110 dbm, it can be seen that 74 db spectrum measurements can be made on an average power basis providing the signal-to-noise ratio is not lessened. In order to be independent of input power variation which may be of the order of 0 to −10 dbm peak, an AGC circuit 9 is provided from the output of the intermediate frequency amplifier 8 to keep the output of the first intermediate frequency amplifier constant at plus 16 dbm. The output of the intermediate frequency amplifier 8 is coupled to a second mixer 10 where it is heterodyned down to 7.4 megacycles by mixing with the signal from a second local oscillator 11. It is assumed that conversion of the signal in the second mixer is on a zero loss basis; consequetly, the signal can be fed directly to three filters, 13, 14 and 15. The filter elements 13, 14 and 15 preferably consist of crystal bandpass networks having a 0.5 megacycle bandwidth at the 6 db point and a 1.0 megacycle bandwith 70 db down; therefore, filter "feedthrough" must be greater than 70 db down. Each filter has equal losses in the amount of 15 db and determines the high level required (+16 dbm) from the intermediate frequency amplifier 8. The center frequencies of the filters 13, 14 and 15 are respectively 6.4 megacycles, 7.4 megacycles, and 8.4 megacycles. These filters will then separate the frequency components into half megacycle bands centered "on channel" and plus or minus one megacycle "off channel." A fixed attenuator 16 representing a 40 db loss and a variable attenuator 17 representing a varying loss from zero to minus 30 db are coupled in series to the output of the 7.4 megacycle filter 14. In combination, therefore, the filter 14 output signal loss can be varied from 40 to 70 db. This variable loss represents the range of spectrum ratio to be measured by this system. The average power levels out of this filter 14 after the signal passes through the fixed attenuator 16 and the variable attenuator 17 vary from −56 dbm to −86 dbm depending on the variable loss. The output of the 6.4 megacycle and 8.4 megacycle filters depend on the relative "off channel" power of the spectrum being measured. If the spectrum is a 40 db spectrum, that is to say, the energy in the "off channel" bands is 40 db below the energy of the "on channel" band, the average power output of the filters will be −56 dbm. If the spectrum is a 70 db spectrum, the output will be −86 dbm. Consequently, it can be seen that the power out of the 7.4 megacycle filter can be varied to match the "off channel" power of each of the two filters 13 and 15 and the number of db of loss inserted in the 7.4 megacycle filter line when match occurs is equal to the ratio of "on channel" to "off channel" power in db. By obtaining the power ratio in this manner, the measurement is made independent of gain within the limit of linear amplifier operation and good signal-to-noise ratio.

The output of the filters 13, 14 and 15 consist of a large number of component frequencies of different amplitudes. Because the signals have this nature, average power contained in the signal is best measured in a power sensitive element such as a bolometer. However, since the power levels out of the filters are too low to properly operate a bolometer element, additional amplification of the signals is required. This must be accomplished without changing the power relationship existing between the three filter outputs. The output of the three filters including the attenuated output of the 7.4 megacycle filter is fed into a second intermediate frequency amplifier 18. The intermediate frequency amplifier 18 has a one db bandwidth of three megacycles and negligible passband ripple. It must have sufficient gain to raise the weakest signal to a level high enough to operate a bolometer element from the output of a second set of crystal filters 19, 20 and 21 to which are fed the output of the intermediate frequency amplifier 18 and which are used to reseparate the frequency components of the signals. The power comparison between the "on channel" signal of 7.4 megacycles and the "off channel" signals of 6.4 and 8.4 megacycles takes place in a power comparison circuit 22 which includes a thermistor bridge circuit to be described in detail later on. Since the power handling range of the bridge circuit is limited, the power into the bridge from the 7.4 megacycle filter is held essentially constant at one mw. This is done by means of an AGC circuit operating from the output of the 7.4 megacycle filter 20 and fed back to the second intermediate frequency amplifier 18 thereby controlling its gain. The outputs of the comparison circuits 22 are coupled to a control circuit 23 which in turn controls an alarm (not shown) and an indicating light 24.

Figure 6:
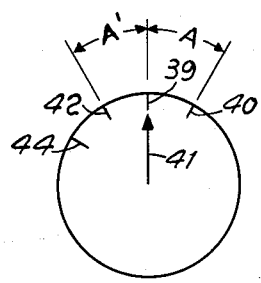
Fig. 6 is the indicating dial of the meter relay.

Referring now to Fig. 4, the detailed schematic of the blocks of the power comparison circuits 22 and control relay 23 are shown. The power comparison circuit 22 comprises two bridges each one of which has two thermistors coupled in series with the midpoint connected to ground. In the comparison circuit associated with the measurement of the high frequency sideband, thermistor 24 is connected to an LC network 26 and thermistor 25 is connected to a similar LC network 27. The outputs of the networks 26 and 27 are connected to the control coil 28 of a meter relay 28' shown in detail in Fig. 5. A second bridge circuit associated with the low frequency sideband comprises the same elements: two thermistors 29 and 30 are connected in series with the junction point of the two thermistor connections and connected to ground. Thermistor 29 is connected to an LC network 31 and the thermistor 30 is connected to an LC network 32, the outputs of the two networks being connected to the control coil 33 of a meter relay 33 which is similar to the meter relay 28'. Th output of each of the LC networks in both bridge circuits are also connected to two resistors 34 and 35 connected in series for one bridge and 36 and 37 connected in series for the other bridge. These resistors constitute bridge arms in their respective bridge circuits. A source of D.C. voltage is coupled to the junction points of each pair of resistors (34 and 35 for one bridge and 36 and 37 for the other), to provide D.C. bias to both bridges. A relay 38 is inserted in the D.C. line to disable the transmitter in case of a D.C. input failure. The output of the 7.4 megacycle filter 20 is coupled to the junction point of the two pairs of condensers at 39 and the signal is split equally between both bridges. The output of the 6.4 megacycle filter 19 is fed into the thermistor 30 and the LC network 32. The output of the 8.4 megacycle filter is fed into the thermistor 25 and the LC network 27. The operation of the bridge circuit is as follows. The signal power applied to the bridges effects a resistance change in the thermistors which in turn incurs a change in the D.C. power dissipated by the thermistors. At bridge balance the power dissipation of each thermistor in each bridge is equal. Any unbalance in the signal power input from filters 19, 20 and 21 therefore causes an unbalance in the bridge which is reflected in the meter relay 28' or 33. If we assume that the spectrum to be monitored must be down to a level of 60 db or better in each adjacent channel as compared to the "on channel," the total attenuation in the 7.4 megacycle filter 14 is set to 60 db. This is done by variation of the variable attenuator 17, to add an additional 20 db attenuation to the fixed attenuation of 40 db of attenuator 16. The output of the 7.4 megacycle filter 20 feeding the two bridge circuits will be 1 mw. (held constant for all spectrum ratios by the AGC circuit) which will be equally divided between the two bridge circuits. In the absence of significant outputs from the two "off channel" filters 19 and 21 (that is, assume no output), both bridge balance meter relays 28 and 33 will read up scale from the center zero (balance point) by an amount determined by bridge sensitivity and this indication represents an infinite spectrum ratio. This bridge indication means is more clearly shown in Fig. 6. The balance point on either of the meter relays 28' and 33 is indicated by the line 39. The up scale point is indicated by the line 40. We can denote the amount of the reading between 39 and 40 by A which corresponds to 0.5 milliwatt of power into the bridge from the 7.4 megacycle filter 20 with no output or negligible output from the adjacent channel filters 19 and 21. It is next assumed that the spectrum power one megacycle lower than the "on channel" frequency is 63 db below the "on channel" power. This power will appear at the terminals of the 6.4 megacycle filter 19 amplified to an average power level of 0.5 mw. When applied to the second leg of the bridge corresponding to the lower adjacent channel, it has the same power as that in the "on channel" leg, from the 7.4 megcycle filter 20, and bridge balance will occur so that the pointer 41 will then point or come to rest at the line 39. Therefore, in this case bridge balance in the meter relays 28 and 33 indicates a spectrum 3 db better than the spectrum being monitored (60 db in this case). Now assume that the spectrum is exactly 60 db down in an adjacent channel. The output of the adjacent channel filter 19 will be 1 mw., which will unbalance the bridge circuit down scale from zero center by an amount A' and the pointer 41 will come to rest at the line 42. It can be seen that meter readings between A and A' represent spectrum power ratios equal to or greater than the nominal setting (60 db) of the spectrum monitor. By using two bridge circuits both the low and the high sideband spectrums are monitored simultaneously and the information as to which sideband spectrum power is faulty is immediately available. Referring more particularly to Figure 5, it can be seen that the control coil 28 of the meter relay 28' or 33 that is actuated by the respective outputs of the thermistor bridges will swing the pointer 41 of the meter relay either to the right or to the left. If it is swung sufficiently to the left, it will strike contact 43 which can be set at any point between 42 and 44. It is obvious that any reading of the meter between lines 42 and 44 is an indication that the power ratio between the "on channel" and an adjacent channel is less than the desired ratio of 60 db. When the pointer strikes the contact 43, it closes the circuit to either of the relays 45 or 46 of the control circuit 23 which will then send an output to an alarm circuit 47 to discontinue operation of the transmitter until the fault is corrected. As long as the transmitter is operating correctly and the power ratio between the "on channel" and adjacent channels is 60 db or better, the pointer 41 of the meter relays does not touch the contacts 43 or 48 and the relays 42 and 43 are in the condition where there is an output to a lamp indicator 49. So long as the lamp is lit, it shows that the transmitter is operating correctly. When the meter relay pointer 41 swings to the contact 43 as a result of a low power ratio or to contact 48 because of failure to maintain a constant level from the "on channel" filter, then the circuit to the lamp 49 is broken and visual indication is made to the operator that the transmitter is malfunctioning. In the event of D.C. input failure, the relay 38 connects the two output leads of the meter relays to shut off the transmitter. The use of the meter relays 28' and 33 serves two purposes. They can be made to initiate the alarm and transfer function and when in normal operation, they can give the station operator advance information on gradual spectrum degradation as it approaches the alarm point so that corrective action can be initiated before failure takes place.

It is to be understood that the power ratios and frequencies cited are by way of example only and this invention is applicable for other power ratios and frequency separations.

While I have described above the principles of my invention in connection with specific apparatus, it is to be clearly understood that this description is made by way of example and not as a limitation to the scope of my invention as set forth in the objects thereof and in the accompanying claims.

I claim:

1. A monitor for a given transmitter transmitting radio frequency waves containing a desired band of frequencies and bands of frequencies adjacent said desired band, wherein said adjacent bands of frequencies may correspond to the desired band of frequencies of other transmitters, comprising for said given transmitter means to separate the frequency bands transmitted by said given transmitter, comparison means to compare the power of the transmitted radio frequency waves of said desired frequency band of said given transmitter with the power of the transmitted radio frequency waves of an adjacent frequency band of said given transmitter, means responsive to said comparison means to indicate when the ratio of said power of said desired frequency band to the power of an adjacent frequency band deviates from a given power ratio, means to discontinue operation of said given transmitter when the ratio of said power of said desired frequency band to the power of an adjacent frequency band falls below said given power ratio and when said ratio is greater than said given ratio by a predetermined amount, said means to separate said frequency bands comprising a filter for each frequency band tuned to the center frequency of said frequency band and having a band width substantially equal to said band, and means to attenuate the power of the signals of said desired frequency band to a desired quantity indicative of said given power ratio between the signal of said desired frequency band and said adjacent bands, said comparison means including first and second thermistor bridges, means coupling the attenuated signals of said desired band to said bridges so that the power of said signals of said desired frequency band is equally divided between said bridges, means coupling the filtered signals of an adjacent band to said first bridge, means coupling the filtered signals of said other adjacent signal band to said second bridge whereby balance in each of said bridges will occur when the half power of said filtered desired signals equals the power of the filtered signals of each of said adjacent signal bands.

2. A power comparing circuit for a plurality of signals including a desired band of frequencies and a band of frequencies adjacent said frequency bands, comprising means to separate the frequency bands of said plurality of signals, means to compare the power of the signals of said desired band of frequencies with the power of the signals of said adjacent band of frequencies, means responsive to said comparison means to indicate when the ratio of said power of said desired frequency band to the power of said adjacent band is below a given power ratio, said means to separate said frequency bands comprising a filter for each frequency band tuned to the center frequency of said band and having a band width substantially equal to said band, the power of said desired band being greater than the power of said adjacent band and means to attenuate the power of the signals of said desired frequency band to a level indicative of the given ratio of the power of said desired frequency band to said adjacent frequency band.

3. A monitor for a transmitter according to claim 1 further including for each bridge a meter relay having a pointer movable over an indicating dial and contacts disposed near the end travel positions of said pointer, said meter relay being adapted to indicate bridge balance when said attenuation means is adjusted to a power ratio larger than said given ratio, one end travel point being indicative of a minimum power ratio less than said given power ratio and the other said end travel point being indicative of a maximum power ratio greater than said given power ratio, a control relay coupled to both said contacts whereby said control relay is energized to discontinue operation of said transmitter when said pointer moves into contact with either of said contacts.

4. A monitor for a transmitter according to claim 3 further including an indicating light coupled to said control relay and said light is energized when said control relay is not operating.

5. A power comparing circuit according to claim 2 wherein said attenuating means include a fixed attenuator coupled to the output of said desired frequency band filter and a variable attenuator coupled in series to the said fixed attenuator whereby the attenuation of said signals of said desired frequency band can be varied within the limits of said variable attenuator and the total attenuation effected by said fixed and variable attenuators is equivalent to said given power ratio of said signals of said desired frequency band to the signals of said adjacent frequency band.

6. A power comparing circuit according to claim 5 further including means to compensate for the loss of power of each said frequency band incurred during transmission of said signals through said circuit.

7. A power comparing circuit according to claim 6 wherein said comparing means include a thermistor bridge circuit and means to supply a direct current bias voltage to said bridge, and further including means coupling said attenuated filtered signals of said desired frequency band and the filtered signals of said adjacent frequency band to the input of said bridge whereby the bridge balance occurs when the half power of said desired frequency band signals is equal to the power in the said adjacent frequency band signals.

8. A power comparing circuit according to claim 7 wherein said indicating means include a meter relay, means coupling the output of said bridge circuit to said meter relay whereby said meter relay will indicate the deviation of the power ratio of said signals of said desired frequency band to said signals of said adjacent frequency band from said given power ratio.

References Cited in the file of this patent

UNITED STATES PATENTS 2,509,207    Busignies _____ May 30, 1950